April 7, 1931. G. W. FELTON 1,799,740
GEARING MECHANISM FOR CHANGING SPEED RATIOS
Filed Sept. 3, 1929
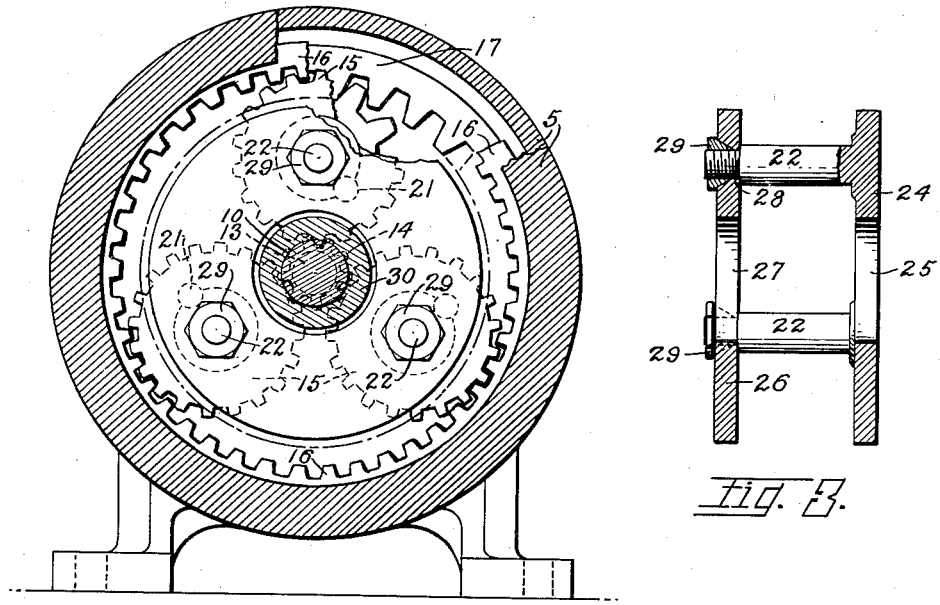
Fig. 1.
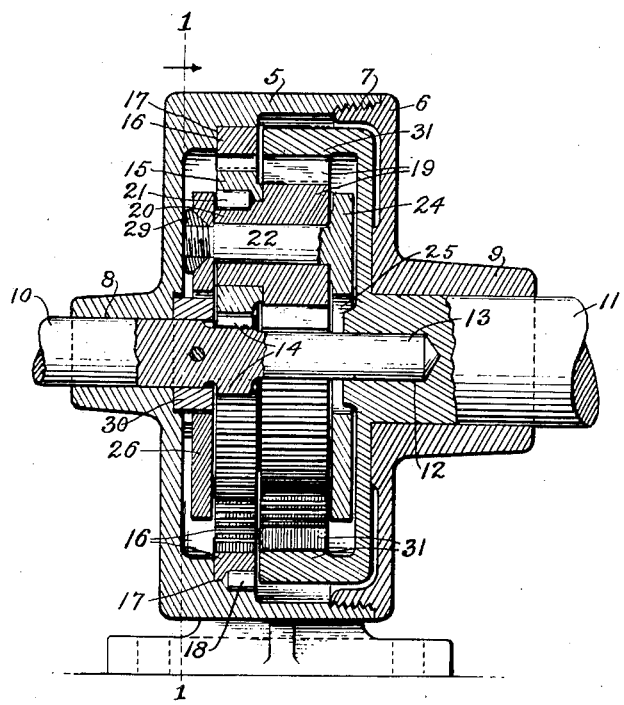
Fig. 2.
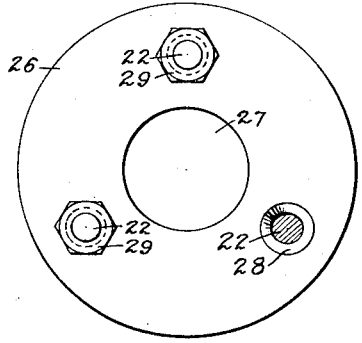
Fig. 3.
Fig. 4.
Inventor,
G. W. Felton.
By Sterling P. Buck,
Attorney.

Patented Apr. 7, 1931

1,799,740

UNITED STATES PATENT OFFICE

GEORGE WILLIAM FELTON, OF HAMILTON, NEW YORK

GEARING MECHANISM FOR CHANGING SPEED RATIOS

Application filed September 3, 1929. Serial No. 390,076.

This invention relates to speed changing devices, and specifically, to a gearing mechanism for changing speed ratios. While I have chosen to call this device a "differential speed reducer", because it is primarily intended for connection with an electric motor and a relatively slow-speed machine to be driven by the motor, it should be understood that the operation can be reversed, so as to change a relatively low speed to a high speed by means of this device.

It is recognized that there are other speed reducing devices which have certain features of similarity to this device, but an object of this invention is to make substantial and important improvements over the previously known speed changing devices.

An object of one of such improvements is to provide a better facility for standardization in devices of this character.

A further object is to minimize the friction and consequent losses in devices of this character, thereby obtaining a very high degree of efficiency.

Another object is to provide for a practically unlimited range of reduction ratio without the use of added parts.

Another object is to provide, in a device of this character, an exceedingly rigid floating planetary carrier for the intermediary gear wheels, which carrier scientifically and practically supports these intermediary gear wheels in their re-action to the load, while avoiding the detrimental twisting effect that is present in certain other speed reducers which have come under observation of the inventor. In other words, an important object is to preserve the necessary parallel contact of the teeth of these intermediary or planetary gear wheels, with respect to the teeth with which they engage. In this connection, it should be clearly understood that if the parallelism of the interengaging teeth is destroyed, there is a consequent uneven wearing of all of the teeth, and uneven wearing will soon result in imperfect operation, and finally in a total destruction of the usefulness of the device.

Other objects and important features are pointed out or implied in the following details of description, in connection with the accompanying drawings in which:

Figure 1 is a vertical sectional view substantially along the line 1—1 of Fig. 2.

Fig. 2 is a vertical sectional view at right angles to Fig. 1, the section being in the plane of the axial center.

Fig. 3 is a central sectional view through the floating gear frame or carrier.

Fig. 4 is a front elevation of the floating gear frame or carrier, one of the gear spindles or axles being shown in section, and the corresponding securing nut being omitted.

Referring to these drawings in detail, in which similar reference characters correspond to similar parts in the several views, the invention is now described in detail as follows:

The casing is formed of two complementary sections 5 and 6, and these sections may be secured to one another by intermeshing screw threads, as indicated at 7, or by other appropriate means. These sections 5 and 6 have axially alined bearings 8 and 9 through which extend rotary shafts 10 and 11 respectively. The shaft 10 is a high-speed shaft, and may be considered as an extension of a motor-shaft. The shaft 11 is the low-speed shaft, and may be the driving shaft of any kind of machine to which it is applicable. For the sake of maintaining perfect axial alinement, the shaft 11 has an axial bore 12, and a reduced end 13 of the shaft 10 is journaled therein.

Now, assuming this device to be used for speed reduction, the gear wheel 14 is the driving gear wheel, and it may be an integral part of the shaft 10, as shown, or may be separately formed and secured by any appropriate means. This gear wheel 14 meshes with the three floating planetary gear wheels 15, as more clearly shown in Fig. 1, but it should be understood that a greater or lesser number of such planetary gear wheels may be employed. These planetary gear wheels 15 mesh with an internal gear wheel 16 which is tightly fitted in an annular groove 17 in the wall of the casing member 5. One or more keys or securing members 18 may be employed to prevent this internal gear from turning or becoming displaced.

Three major planetary gear wheels 19 are provided with reduced extensions or bosses 20 on which the respective wheels 15 are secured by means of keys or fastening members 21. While this is a preferred construction, for certain reasons, there are reasons which might be stated in favor of making each planetary gear wheel 15 integral with one of the planetary gear wheels 19. Each planetary wheel 19 is journaled on a spindle or stub shaft 22. As shown in Figs. 1 and 4, there are three of these stub shafts, one for each of the wheels 19. These stub shafts may be integrally united with the disk or plate 24 which is centrally apertured at 25 for permitting the shaft 10—13 to extend therethrough. A plate or disk 26 is centrally apertured at 27, and eccentrically apertured at 28 to receive a reduced screw-threaded end of each stub shaft 22. Although I have shown cone-nuts 29 on the screw-threaded ends of the shafts 22, for the sake of compactness and rigidity, the invention is not limited to this feature, nor to the countersunk apertures 28 into which the conical parts of the nuts 29 are tightly fitted when screwed into place. From an observation of the rigid frame which is illustrated in Fig. 3, it will be seen that the twisting of such frame, in consequence of the stresses to which it is subjected, will be reduced to a negligible degree. Moreover, it will be seen that the openings 25 and 27 are considerably larger than the parts which they surround, that is, the shaft-extension 13 and a retaining collar 30 which latter is keyed on the shaft 10. In view of this clearance at the margins of the openings 25 and 27, it will be seen that the gear wheels and their supporting frame (Figs. 3 and 4) are supported entirely by their engagement with the internal gear wheel 16 and an internal gear wheel 31 which is here shown as an integral part or extension of the shaft 11. Therefore, the friction is reduced to a minimum, because the floating frame has no bearing other than those which support its weight, that is, the bearings 22. In other words, the floating frame (Figs. 3 and 4) does not support the wheels, but is supported by the journals of the wheels. The wheels need no support other than the gear teeth with which they intermesh. This intermeshing relation prevents them from becoming displaced with relation to one another, and the casing prevents them from becoming displaced axially; but the purpose of the floating frame is to prevent these wheels from becoming twisted so as to move their teeth out of parallelism; for it is readily seen that the difference in pressure or opposite pressures on the wheels 19 and on the wheels 15 has a strong tendency to twist the wheels and throw their axes out of parallelism with the axis of the driving and driven shafts 10 and 11, thus also throwing their teeth out of parallelism. However, this tendency is effectually overcome by the rigidly united axles 22 and disks 24 and 26.

In manufacturing devices of this kind, it is readily seen that different speed ratios can be obtained by changing the diameters of the wheels 15 and 16, and also by changing the diameters of the wheels 19 and 31. For making such changes of speed ratio after the device is assembled, the nuts 29 may be removed, and the disk 26 removed from the stub axles 22, and after the changes of ratio are made, the disk 26 and nuts 29 can be replaced.

An observation of Fig. 2 shows that this casing can be packed with lubricating material or grease, and that it will effectively retain the same so that the device will work smoothly and efficiently through a long period of time, without the necessity of repair or re-lubricating.

Although I have described this embodiment my invention specifically, it is not my intention to limit my patent protection to these exact details of construction and arrangement, for the invention is susceptible of numerous changes within the scope of the inventive ideas as implied and claimed.

What I claim as my invention is:

1. In an element of a speed changing device, the combination of a centrally apertured plate, a plurality of stub axles rigidly and fixedly united with said plate in eccentric relation thereto and equally spaced from the center of the central aperture, a second centrally apertured plate, means to removably secure the second plate to the stub axles to form a rigid frame of which the central apertures are axially alined, and gear units journalled on the respective stub axles, each of said gear-units comprising two gear-wheels of different diameters.

2. In a speed changing device, the combination of a casing, axially alined shafts journalled therein, a driving gear wheel on one of the shafts, a driven gear wheel on the other one of the shafts, an annular gear wheel held by the casing and encompassing said driving gear wheel, intermediary gear units each including two planetary gear wheels having a journal-bearing therethrough one planetary wheel of each unit meshing with said driving wheel and with said annular gear wheel, the other planetary wheel of each unit meshing with said driven wheel, and a centrally apertured frame around said axially alined shafts and spaced therefrom and including stub axles on which said intermediary gear units are journalled, said frame including centrally apertured plates with which all of said stub axles are rigidly united to make the frame very rigid so as to overcome the tendency of the intermediary gear wheels to twist out of axial parallelism with respect to the driving and driven gear wheels.

In testimony whereof I affix my signature.

GEORGE WILLIAM FELTON.